United States Patent
Fukushima et al.

(10) Patent No.: US 8,950,778 B2
(45) Date of Patent: Feb. 10, 2015

(54) VEHICLE-OCCUPANT PROTECTION STRUCTURE AND VEHICLE-OCCUPANT PROTECTION METHOD

(75) Inventors: Masanobu Fukushima, Higashihiroshima (JP); Hiroto Kido, Aki-gun (JP); Hiromasa Honji, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/345,251

(22) PCT Filed: Jul. 30, 2012

(86) PCT No.: PCT/JP2012/004829
§ 371 (c)(1),
(2), (4) Date: Mar. 16, 2014

(87) PCT Pub. No.: WO2013/108304
PCT Pub. Date: Jul. 25, 2013

(65) Prior Publication Data
US 2014/0319812 A1 Oct. 30, 2014

(30) Foreign Application Priority Data
Jan. 18, 2012 (JP) ................................. 2012-007867

(51) Int. Cl.
*B62D 1/16* (2006.01)

(52) U.S. Cl.
USPC ...................................................... 280/779

(58) Field of Classification Search
USPC ........... 280/779; 180/90; 296/193.02, 193.09, 296/72, 204
See application file for complete search history.

(56) References Cited

U.S. PATENT DOCUMENTS

| | | | | |
|---|---|---|---|---|
| 4,362,319 A | * | 12/1982 | Masaki et al. | 280/779 |
| 5,238,286 A | * | 8/1993 | Tanaka et al. | 296/70 |
| 5,685,564 A | | 11/1997 | Iijima et al. | |
| 5,934,733 A | * | 8/1999 | Manwaring | 296/72 |
| 6,988,764 B2 | * | 1/2006 | Matsutani | 296/193.02 |
| 7,686,334 B2 | * | 3/2010 | Schaupensteiner | 280/752 |
| 8,141,903 B2 | * | 3/2012 | Atsumi et al. | 280/779 |
| 8,393,671 B2 | * | 3/2013 | Watanabe | 296/193.02 |
| 2004/0135400 A1 | * | 7/2004 | Matsuzaki et al. | 296/193.02 |

FOREIGN PATENT DOCUMENTS

JP 61-051268 U 4/1986
JP 64-025968 U 2/1989

(Continued)

OTHER PUBLICATIONS

International Search Report; PCT/JP2012/004829; Oct. 30, 2012.

*Primary Examiner* — Faye M. Fleming
(74) *Attorney, Agent, or Firm* — Studebaker & Brackett PC

(57) ABSTRACT

The strength of an instrument panel member (12) at a portion thereof between a steering shaft support part (16) and a linking part (13) on the side near a steering shaft (11) is set lower than the strength of the instrument panel member (12) at a portion thereof between the steering shaft support part (16) and a linking part (14) on the far side from the steering shaft (11), with respect to a load input through the linking part (13) on the side near the steering shaft (11) in the vehicle body front-rear direction. The above configuration makes it possible to suppress movement of a steering wheel inward in the vehicle width direction to thereby securely restrain a vehicle occupant by an airbag at the time of a vehicle frontal collision.

3 Claims, 10 Drawing Sheets

(56) References Cited

FOREIGN PATENT DOCUMENTS

| | | |
|---|---|---|
| JP | 08-113148 A | 5/1995 |
| JP | 2000-344139 A | 12/2000 |
| JP | 2007-261382 A | 10/2007 |
| JP | 2010-179674 A | 8/2010 |

* cited by examiner

VEHICLE-OCCUPANT PROTECTION STRUCTURE AND VEHICLE-OCCUPANT PROTECTION METHOD

TECHNICAL FIELD

The present invention relates to a structure and a method for protecting a vehicle occupant in a vehicle comprising a pair of vehicle body component members disposed on the left side and the right side of a vehicle body, an instrument panel member disposed to extend in the vehicle width direction between the paired vehicle body component members, and a pair of linking parts disposed on both ends of the instrument panel member in the vehicle width direction and linked to inner walls of the respective vehicle body component members.

BACKGROUND ART

Generally, in the case where a hinge pillar is retracted or inwardly deformed by an offset collision of a vehicle, an instrument panel member having an end linked to the hinge pillar is bent toward the vehicle body rear side around a portion near a center stay which is located substantially at a center part of the instrument panel member in the vehicle width direction.

If the instrument panel member is deformed as described above, a steering shaft supported on the instrument panel member is moved inward in the vehicle width direction, and a steering wheel is also moved inward in the vehicle width direction, as the steering shaft is moved. This means that the restraining position of a vehicle occupant by an airbag provided in the steering wheel is displaced inward in the vehicle width direction. It is necessary to design the structure of an instrument panel member itself, the fastening structure between an instrument panel member and peripheral members, and the layout of peripheral members relative to an instrument panel member in order to prevent such a drawback, while satisfying other requirements. Simply increasing the strength of an instrument panel member, however, may result in an increase in the weight of a vehicle body. Further, modifying the layout of peripheral members is not easy in view of the design constraints. Particularly, in recent years, there is a demand for taking measures against a pole collision or a small overlap collision of a vehicle. Thus, there is a need for a technology that enables to enhance safety of a vehicle occupant, while solving the above drawback.

Patent literature 1 and patent literature 2 are known as a technology for securely restraining a vehicle occupant by an airbag.

The conventional art disclosed in patent literature 1 is such that an accurate operation of an airbag device and the like is secured by preventing forward and upward turning of a steering wheel at the time of a vehicle frontal collision. Patent literature 1, however, is not designed to suppress movement of an instrument panel member and a steering wheel in the vehicle width direction, and fails to solve the above drawback.

The conventional art disclosed in patent literature 2 is provided with a turning device capable of changing the deployment direction of an airbag. According to this technology, at the time of a vehicle frontal collision, even if the head of a vehicle occupant is displaced in the left-right direction (in the vehicle width direction) with respect to the center of a steering wheel, the head of the vehicle occupant can be securely restrained by changing the deployment direction of the airbag in such a direction as to compensate for the displacement, with use of the turning device. In patent literature 2, however, a turning device for changing the deployment direction of an airbag is indispensable. Accordingly, the structure may be complicated.

CITATION LIST

Patent Literature

Patent literature 1: JP Hei 8-113148A
Patent literature 2: JP 2010-179674A

SUMMARY OF INVENTION

In view of the above drawbacks residing in the conventional art, an object of the invention is to provide a configuration that enables to suppress movement of a steering wheel inward in the vehicle width direction with a simplified structure to thereby securely restrain a vehicle occupant by an airbag.

A vehicle-occupant protection structure of the invention for accomplishing the above object is applied to a vehicle comprising a pair of vehicle body component members disposed on a left side and a right side of a vehicle body, an instrument panel member disposed to extend in a vehicle width direction between the paired vehicle body component members, and a pair of linking parts disposed on both ends of the instrument panel member in the vehicle width direction and linked to inner walls of the respective vehicle body component members. In the vehicle-occupant protection structure, a steering shaft support part configured to support a steering shaft is disposed on a portion of the instrument panel member on the left side or the right side with respect to a center part of the instrument panel member in the vehicle width direction. A strength of the instrument panel member at a portion thereof between the steering shaft support part and the linking part on a side near the steering shaft is set lower than a strength of the instrument panel member at a portion thereof between the steering shaft support part and the linking part on a far side from the steering shaft, with respect to a load input through the linking part on the side near the steering shaft in a vehicle body front-rear direction.

According to the invention, at the time of a vehicle frontal collision, the portion of the instrument panel member between the steering shaft support part and the linking part on the side near the steering shaft is bent first. Accordingly, the above configuration is advantageous in suppressing movement of the steering wheel inward in the vehicle width direction to thereby securely restrain a vehicle occupant by an airbag.

DESCRIPTION OF EMBODIMENTS

Figure 1:
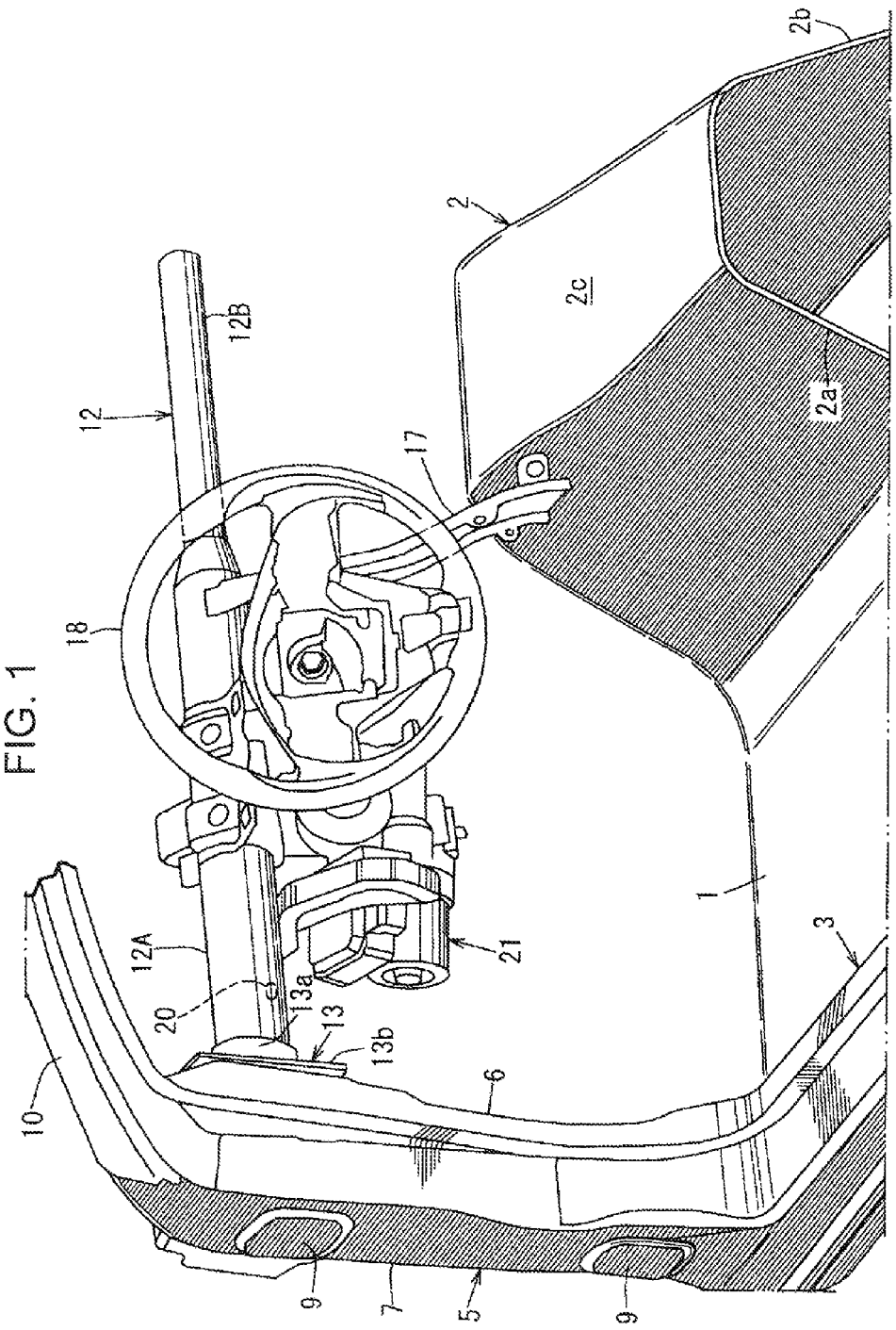
FIG. 1 is a perspective view illustrating a vehicle-occupant protection structure according to an embodiment of the invention.
Figure 2:
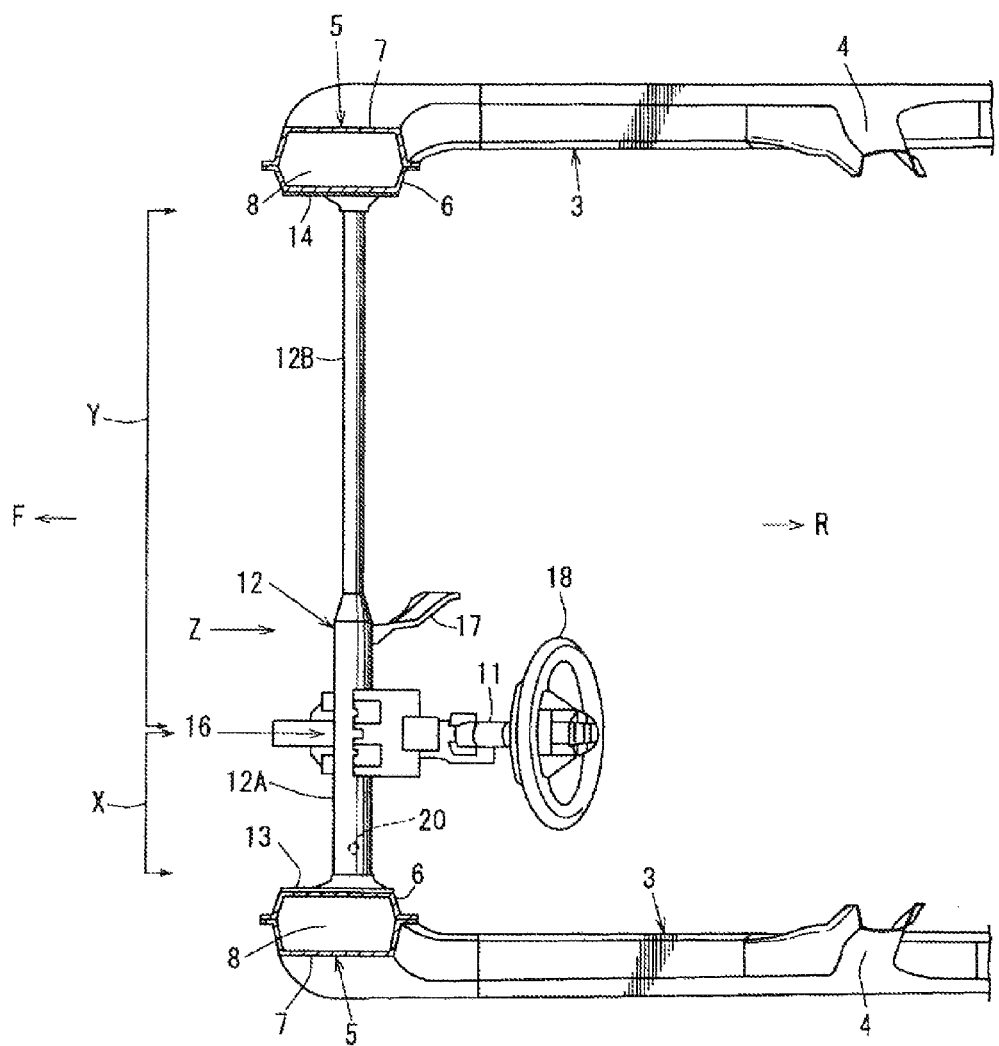
FIG. 2 is an enlarged view illustrating essential parts of FIG. 1.

In the following, an embodiment of the invention will be described in detail, referring to the drawings. FIG. 1 is a perspective view illustrating a vehicle-occupant protection structure of the embodiment. FIG. 2 is a plan view illustrating essential parts of FIG. 1. In the drawings, the arrow F indicates the vehicle body front side, and the arrow R indicates the vehicle body rear side.

Referring to FIG. 1 and FIG. 2, a floor panel 1 is provided on a bottom surface part of a vehicle cabin. A tunnel part 2 is integrally formed at a center part of the floor panel 1 in the vehicle width direction in such a manner as to project into the vehicle cabin and to extend in the vehicle body front-rear direction.

The tunnel part 2 is formed into a substantially hat shape in cross-section, with left and right side walls 2a and 2b, and a top deck surface 2c. The tunnel part 2 is a primary member configured to enhance the rigidity of a vehicle body bottom part.

A pair of left and right side sills 3, 3 extending in the vehicle body front-rear direction are fixedly joined to left and right sides of the floor panel 1. The side sill 3 is a vehicle body reinforcing member having a closed cross-section extending in the vehicle body front-rear direction. The side sill 3 has a side sill inner part and a side sill outer part joined to each other via the closed cross-section.

Referring to FIG. 1, the reference numeral 18 indicates a steering wheel, and the reference numeral 21 indicates an electric power steering unit. The steering wheel 18 and the electric power steering unit 21 are disposed in front of an unillustrated driver seat. The embodiment is described based on the premise that the vehicle is a left-hand drive car, and the driver seat is provided at a position near the left side in the vehicle cabin.

As illustrated in FIG. 2, a vehicle body side surface is formed with an opening for allowing a front seat occupant to get in and out of the vehicle, and an opening for allowing a rear seat occupant to get in and out of the vehicle. A center pillar 4 extending in the up-down direction is provided between the openings. A lower end of the center pillar 4 is linked to the side sill 3. The center pillar 4 is a vehicle body reinforcing member having a closed cross-section extending in the vehicle body up-down direction. The center pillar 4 has a center pillar inner part and a center pillar outer part joined to each other via the closed cross-section.

Further, as illustrated in FIG. 1 and FIG. 2, a hinge pillar 5 rising upward from the side sill 3 is formed on a front end of each of the left and right paired side sills 3, 3. The left and right paired hinge pillars 5, 5 are a vehicle body reinforcing member having a closed cross-section 8 extending in the vehicle body up-down direction. The hinge pillar 5 has a hinge pillar inner part 6 and a hinge pillar outer part 7 joined to each other via the closed cross-section 8.

Bracket surfaces 9, 9 for receiving a vehicle-body-side door hinge bracket (not illustrated) configured to openably and closably support a front door are formed on the vehicle outer surface of the hinge pillar outer part 7. The bracket surfaces 9, 9 are formed to integrally rise from the vehicle outer surface of the hinge pillar outer part 7.

Further, as illustrated in FIG. 1, an upper part of the hinge pillar 5 is connected to a lower end of a front pillar 10 extending upward and rearward from the hinge pillar 5. The front pillar 10 is a vehicle body reinforcing member having a closed cross-section extending rearward and upward with an inclination. The front pillar 10 has a front pillar inner part and a front pillar outer part joined to each other via the closed cross-section.

An instrument panel member 12 made of a metal pipe and configured to support a steering shaft 11 is disposed to extend in the vehicle width direction between the hinge pillars 5, 5 as a pair of left and right vehicle body component members.

In this embodiment, the instrument panel member 12 has a large diameter part 12A formed on the driver seat side (on the left side), and a small diameter part 12B formed on a passenger seat side (on the right side). Instrument panel side brackets 13, 14 are provided on both ends of the instrument panel member 12 in the vehicle width direction. The instrument panel side brackets 13, 14 are respectively linked to the hinge pillar inner parts 6, 6 as inner walls of the hinge pillars 5, 5 (vehicle body component members). The instrument panel side brackets 13, 14 correspond to a pair of linking parts. Both ends of the instrument panel member 12 in the vehicle width direction are connected to the left and right paired hinge pillars 5, 5 via the instrument panel side brackets 13, 14.

Figure 3:
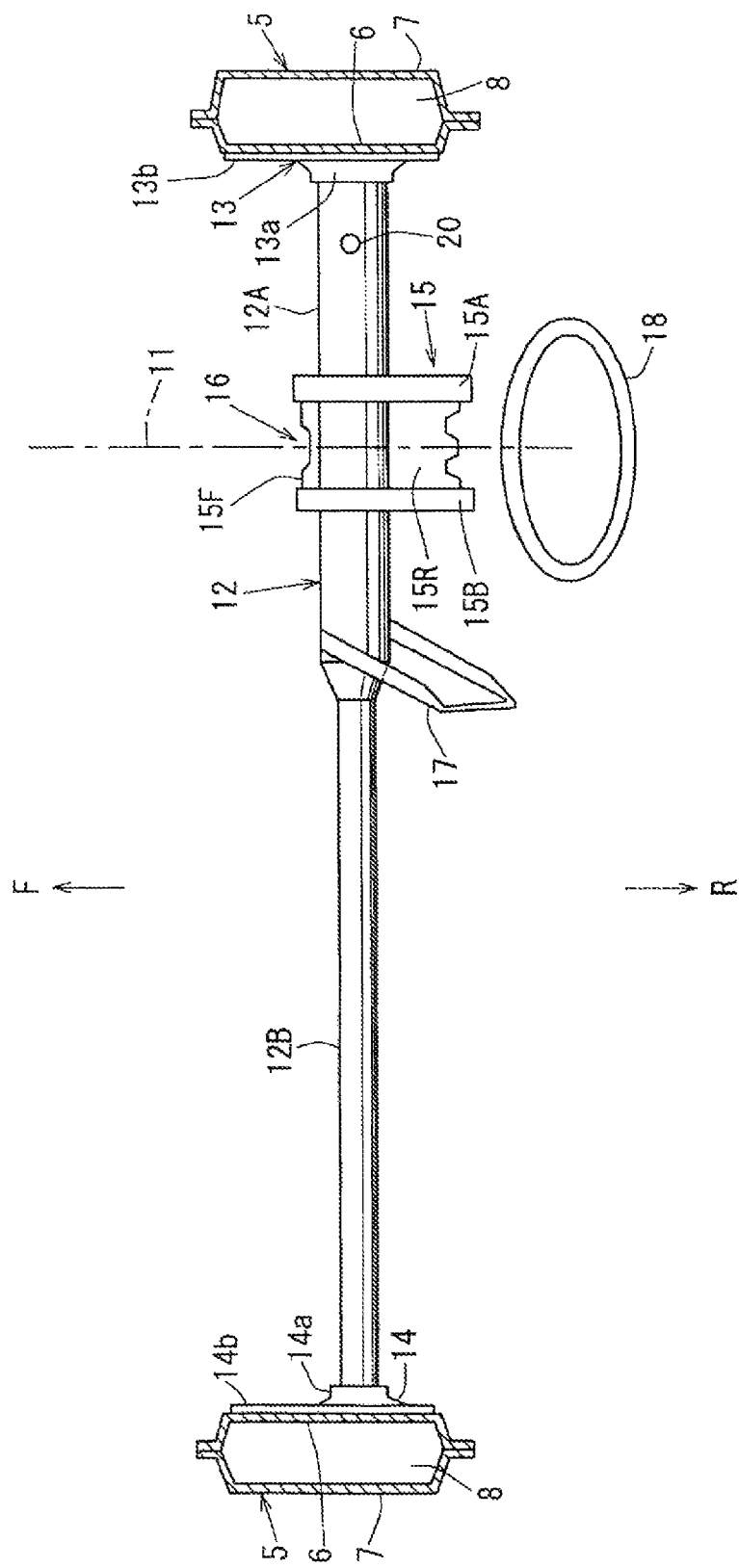
FIG. 3 is a bottom plan view illustrating the vehicle-occupant protection structure.
Figure 4:
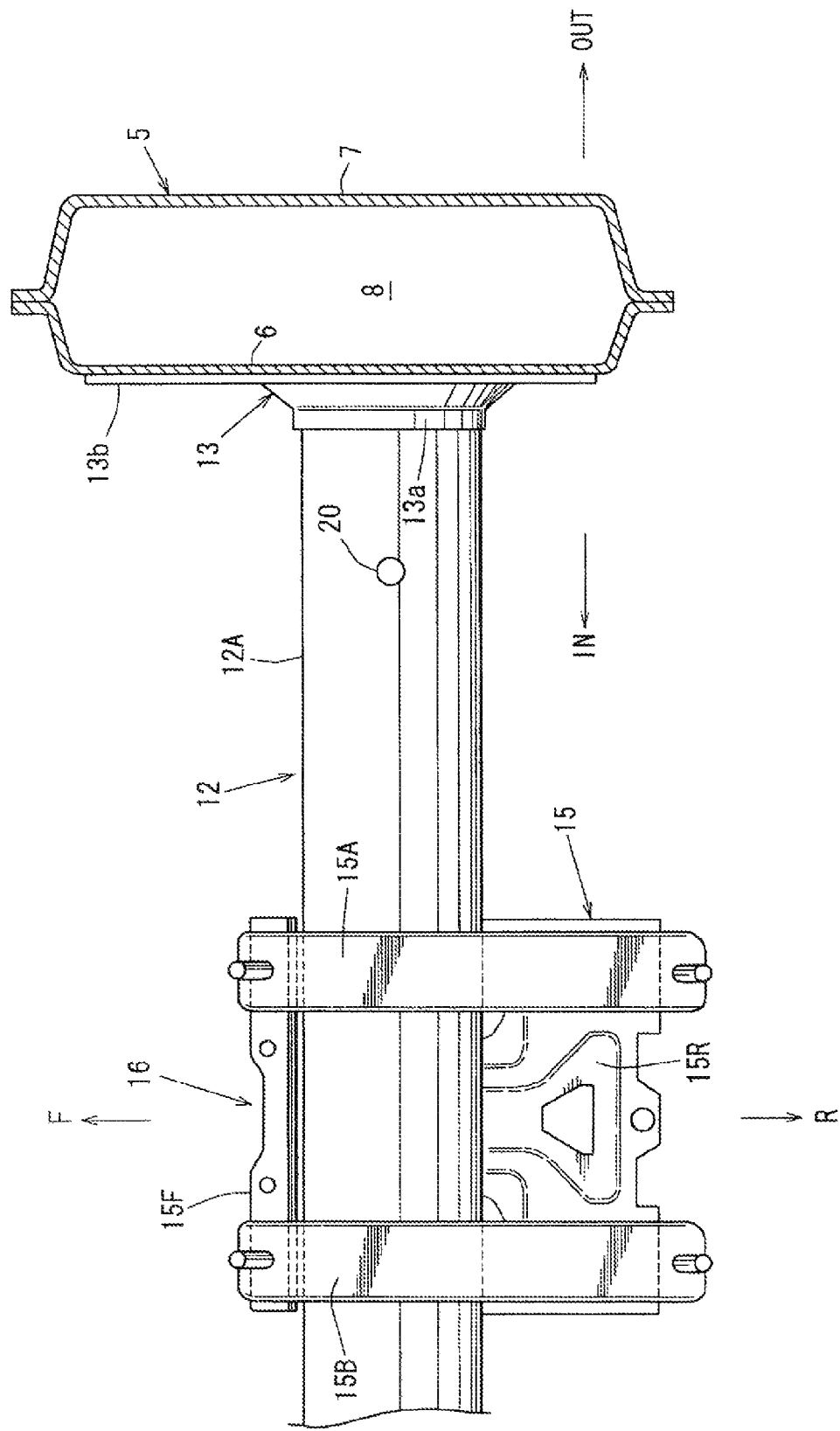
FIG. 4 is an enlarged view illustrating essential parts of FIG. 3.

As illustrated in FIG. 3 and FIG. 4, the instrument panel side brackets 13, 14 have tubular parts 13a, 14a to be linked to both ends of the instrument panel member 12, and linking flange parts 13b, 14b to be linked to the hinge pillar inner parts 6, 6.

As schematically illustrated in the bottom plan view of a steering support structure in FIG. 3, the steering shaft 11 is supported on the large diameter part 12A of the instrument panel member 12 via a steering support bracket 15.

As illustrated in FIG. 4, which is an enlarged view of the essential parts of FIG. 3, the steering support bracket 15 has a pair of left and right side brackets 15A, 15B having a C-shape in cross-section and fixedly linked to the instrument panel member 12, a front bracket 15F connecting between front upper parts of the left and right paired side brackets 15A, 15B in the vehicle width direction, and a rear bracket 15R connecting between rear upper parts of the left and right paired side brackets 15A, 15B in the vehicle width direction. Referring to FIG. 4, the arrow IN indicates inward in the vehicle width direction, and the arrow OUT indicates outward in the vehicle width direction.

As described above, the steering shaft 11 is supported on the instrument panel member 12 via the steering support bracket 15. Accordingly, in the following, a part of the steering support bracket 15 to be mounted on the instrument panel member 12, more specifically, a center part of the steering support bracket 15 in the vehicle width direction is called as a steering shaft support part 16. The steering shaft support part 16 is formed at a position near the left side than the center part of the instrument panel member 12 in the vehicle width direction to conform with a configuration, in which the steering wheel 18 and the steering shaft 11 are provided in front of the driver seat.

As illustrated in FIG. 1 and FIG. 2, the instrument panel member 12 is supported on the left side wall 2a of the tunnel part 2 via a center stay 17, as a support member mounted between the steering shaft support part 16 and the instrument panel side bracket 14 (a linking part) on the far side from the steering shaft 11. In other words, not only left and right both ends of the instrument panel member 12 are linked to the hinge pillars 5, 5 (a pair of vehicle body component members) via the instrument panel side brackets 13, 14, but also an intermediate part of the instrument panel member 12 in the vehicle width direction is linked to the tunnel part 2 (other vehicle body component member) via the center stay 17, whereby the instrument panel member 12 is fixed between the left and right hinge pillars 5, 5.

The steering shaft 11 is rotatably supported on the instrument panel member 12 which is rigidly fixed to the vehicle body as described above, via the steering support bracket 15 and a steering column. Further, the steering wheel 18 for allowing the driver to steer the front wheels is mounted on a rear end of the steering shaft 11.

The steering wheel 18 is installed with a frontal airbag device for a driver seat. The frontal airbag device has an airbag 19 (see FIG. 5) as a bag body configured to deploy in such a manner as to cover the steering wheel 18 at the time of a vehicle frontal collision.

In this embodiment, assuming that a small overlap collision has occurred on the front surface of the vehicle body, the hinge pillar 5 on the side (on the left side in this embodiment) near the steering shaft 11 is pressed toward the vehicle body rear side. As the hinge pillar 5 is pressed, a load in the vehicle body front-rear direction is input through the instrument panel side bracket 13 on the side near the steering shaft 11. In this embodiment, the following configuration is employed in order to suppress movement of the steering wheel 18 inward in the vehicle width direction by the input load.

Specifically, the strength of the instrument panel member 12 at a portion thereof (the range indicated by X in FIG. 2) between the steering shaft support part 16 and the instrument panel side bracket 13 on the side near the steering shaft 11 is set lower than the strength of the instrument panel member 12 at a portion thereof (the range indicated by Y in FIG. 2) between the steering shaft support part 16 and the instrument panel side bracket 14 on the far side from the steering shaft 11, with respect to the input load.

More specifically, a strength difference of the instrument panel member 12 is set such that a portion of the instrument panel member 12 between the steering shaft support part 16 and the instrument panel side bracket 13 on the side near the steering shaft 11 is bent prior to a portion of the instrument panel member 12 on which the center stay 17 is mounted, by the load input through the instrument panel side bracket 13 on the side near the steering shaft 11 in the vehicle body front-rear direction at the time of the small overlap collision.

In other words, the strength in the range X is set lower than the strength in the range Y so that the portion of the instrument panel member 12 belonging to the range X in FIG. 2 is bent prior to a mounting part Z of the center stay 17 illustrated in FIG. 2, by the input load at the time of a small overlap collision.

Specifically, in this embodiment, a hole part 20 as a fragile part is formed in a portion (any position in the range X) of the instrument panel member 12 between the steering shaft support part 16 and the instrument panel side bracket 13 on the side near the steering shaft 11 in order to secure the aforementioned strength difference. The existence of the hole part 20 makes the portion corresponding to the range X fragile.

Preferably, the hole part 20 (a fragile part) may be formed in one of the positions selected from an upper part, a lower part, and a rear part of an outer peripheral part of the instrument panel member 12. In other words, assuming that the instrument panel member 12 is divided into two parts by a centerline passing through a cross-sectional center of the instrument panel member 12 and extending in the vehicle body up-down direction, the hole part 20 may preferably be formed in a rear side region corresponding to the vehicle body rear side with respect to the centerline, rather than in a front side region corresponding to the vehicle body front side with respect to the centerline. In this embodiment, as illustrated in FIG. 1 to FIG. 4, the hole part 20 is formed to pass through a lower part of the large diameter part 12A of the instrument panel member 12. Thus, the hole part 20 (a fragile part) is formed in the lower part of the outer peripheral part of the instrument panel member 12.

In the following, an operation based on the configuration of this embodiment is described.

Figure 5:
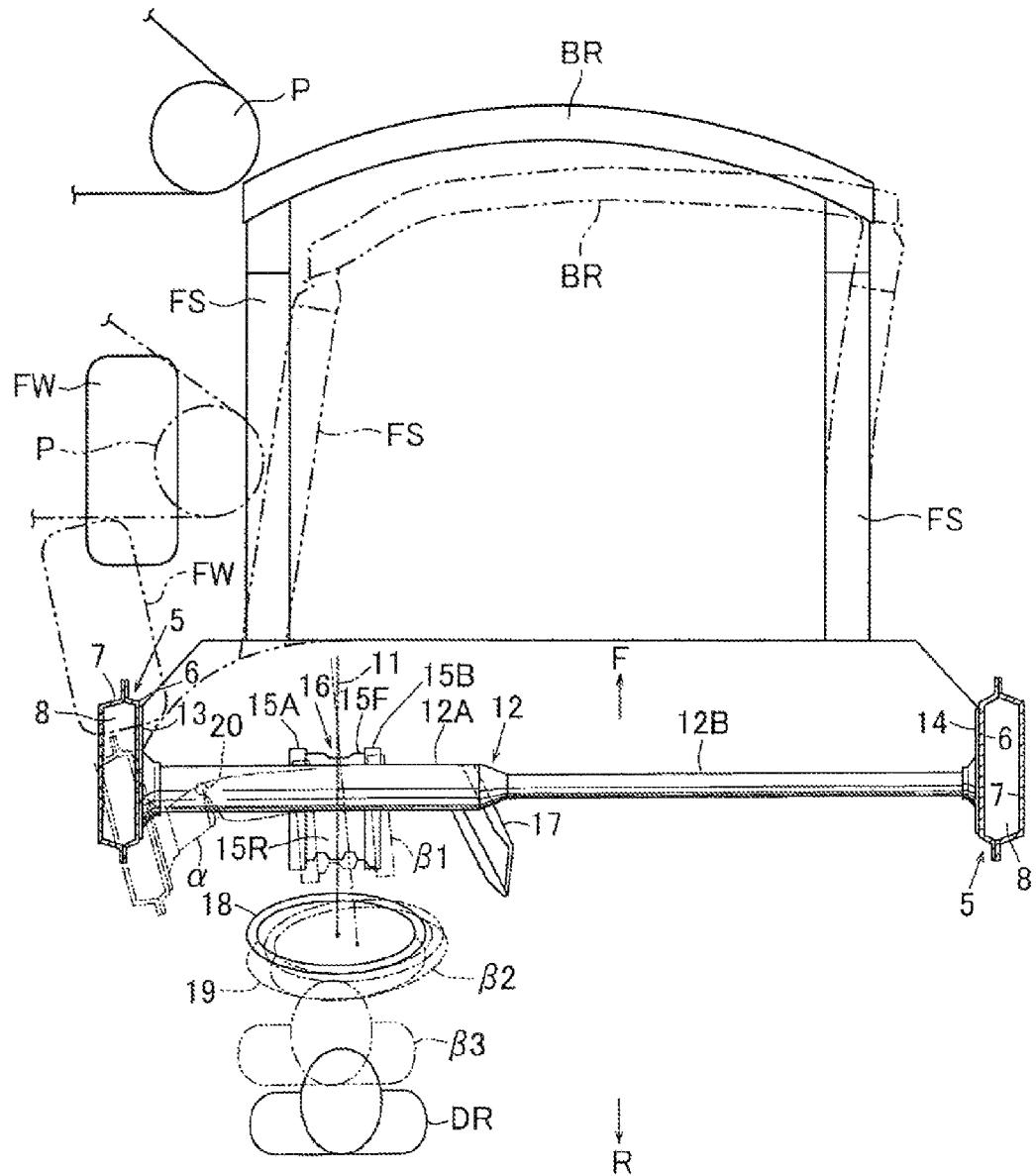
FIG. 5 is a plan view illustrating an operation at the time of a vehicle frontal collision.

The instrument panel member 12 is supported on the center stay 17 as a support member. Accordingly, in the case where a vehicle frontal collision, particularly, a small overlap collision (an accident such that a vehicle collides with an obstacle P such as a pole at a position on the vehicle outer side than a pair of left and right front side frames FS provided on the vehicle body front part) has occurred as illustrated in FIG. 5, the position of the steering wheel 18 in the vehicle width direction may be largely displaced, if no measure is taken. For instance, let it be assumed that in a conventional structure without a hole part 20 as a fragile part, a collision such as the aforementioned small overlap collision has occurred. In such a case, a hinge pillar may be retracted by an obstacle, and a large bending moment may act on an instrument panel member. As a result, the instrument panel member may be bent and deformed around a mounting part of a center stay. If such a deformation occurs, a portion of the instrument panel member between the mounting part of the center stay and a left-side instrument panel side bracket may be largely moved toward the vehicle body rear side. According to this, a rear part of a steering shaft and a steering wheel may be moved inward in the vehicle width direction. There is an idea of increasing the strength of a instrument panel member in order to prevent such an incident. This idea, however, may result in an increase of the weight of a vehicle body. Further, there is another idea of modifying the fastening structure between an instrument panel member and peripheral members, and the layout of peripheral members. However, it is not easy to implement this idea in view of the design constraints.

In contrast, in this embodiment, a relatively simplified structure of forming the hole part 20 as a fragile part makes it possible to suppress movement of the steering wheel 18 in the vehicle width direction at the time of a vehicle frontal collision, particularly, at the time of a small overlap collision. Specifically, in the structure of this embodiment, if a vehicle collides with an obstacle P such as a pole at a position on the outer side of the left-side front side frame FS in the vehicle width direction, a bumper (not illustrated) or the like on the vehicle body front surface may be broken due to the collision with the obstacle P. Thereafter, a portion around the left end of a bumper reinforcement BR in the vehicle width direction may come in contact with the obstacle P, and a front wheel FW may be pressed toward the vehicle body rear side by the obstacle P, with the result that the front wheel FW may press the hinge pillar 5 toward the vehicle body rear side. In this way, even in the structure of this embodiment, the hinge pillar 5 may be retracted as well as the conventional structure described above. However, in the embodiment, even if the hinge pillar 5 is retracted, the instrument panel member 12 is bent around the hole part 20, as illustrated by the imaginary line α in FIG. 5. Therefore, the deformation amount of the steering shaft support part 16 of the instrument panel member 12 toward inward in the vehicle width direction is as illustrated by the imaginary line β1 in FIG. 5. The deformation amount of the steering shaft support part 16 as illustrated by the imaginary line β1 is small, as compared with the deformation amount in the case where the instrument panel member 12 is deformed around the mounting part of the center stay 17. Accordingly, the deformation amounts of the rear part of the steering wheel 18 and the airbag 19 inward in the vehicle width direction are also a very small amount, as illustrated by the imaginary line β2 in FIG. 5.

In other words, in the structure of this embodiment, the instrument panel member 12 at a portion thereof between the steering shaft support part 16 and the instrument panel side bracket 13 on the side near the steering shaft 11 is bent around the hole part 20 first at the time of a small overlap collision. Accordingly, movement of the steering shaft 11 and the steering wheel 18 inward in the vehicle width direction is suppressed (see the imaginary line β2 in FIG. 5), whereby it is possible to securely restrain a vehicle occupant DR (a vehicle occupant as represented by the imaginary line β3, who tends to lean forward by an inertia at the time of a collision), by the airbag 19 deployed from the steering wheel 18.

As described above, the vehicle-occupant protection structure of the embodiment illustrated in FIG. 1 to FIG. 5 is applied to a vehicle comprising the left and right paired hinge pillars 5, 5 (vehicle body component members), the instrument panel member 12 disposed to extend in the vehicle width direction between the paired hinge pillars 5, 5, and the paired instrument panel side brackets 13, 14 (linking parts) disposed on both ends of the instrument panel member 12 in the vehicle width direction and linked to the hinge pillar inner parts 6, 6 (inner walls of the vehicle body component members) of the respective hinge pillars 5, 5. The vehicle-occupant protection structure is configured such that the strength of the instrument panel member 12 at a portion thereof (the range X illustrated in FIG. 2) between the steering shaft support part 16 and the instrument panel side bracket 13 on the side (the driver seat side) near the steering shaft 11 is set lower than the strength of the instrument panel member 12 at a portion thereof (the range Y illustrated in FIG. 2) between the steering shaft support part 16 and the instrument panel side bracket 14 on the far side (the passenger seat side) from the steering shaft 11, with respect to a load input through the instrument panel side bracket 13 on the side near the steering shaft 11 in the vehicle body front-rear direction.

According to the above configuration, a portion (a portion of the instrument panel member whose strength is weak) of the instrument panel member 12 between the steering shaft support part 16 and the instrument panel side bracket 13 on the side near the steering shaft 11 is bent first at the time of a vehicle frontal collision, particularly, at the time of a small overlap collision. Accordingly, movement of the rear part of the steering shaft 11 and the steering wheel 18 inward in the vehicle width direction is suppressed, whereby it is possible to securely restrain the vehicle occupant DR (specifically, the head and the breast of a vehicle occupant) by the airbag 19 deployed from the steering wheel 18.

In this embodiment, the center stay 17 (a support member) to be linked to the tunnel part 2 (another vehicle body component member) on the vehicle body bottom part is mounted on a portion of the instrument panel member 12 between the steering shaft support part 16 and the instrument panel side bracket 14 on the far side from the steering shaft 11. The mounting part Z of the center stay 17 is far from a portion of the instrument panel member 12 (i.e. the instrument panel side bracket 13 on the side near the steering shaft 11) through which a load is input at the time of a small overlap collision, and a stress tends to concentrate on the mounting part Z. Accordingly, it is conceived that the instrument panel member 12 is likely to bend around the mounting part Z of the center stay 17, if no measure is taken. It is, however, necessary to avoid such an incident in order to securely restrain the vehicle occupant DR by the airbag 19 deployed from the steering wheel 18.

In view of the above, in this embodiment, the strength difference of the instrument panel member 12 is set such that the instrument panel member 12 at a portion thereof (the range X illustrated in FIG. 2) between the steering shaft support part 16 and the instrument panel side bracket 13 on the side near the steering shaft 11 is bent, prior to the instrument panel member 12 at a portion thereof (the mounting part Z) on which the center stay 17 is mounted, by the load input through the instrument panel side bracket 13 on the side near the steering shaft 11 in the vehicle body front-rear direction.

According to the above configuration, the portion of the instrument panel member 12 between the steering shaft support part 16 and the instrument panel side bracket 13 on the side near the steering shaft 11 is bent prior to the portion of the instrument panel member 12 on which the center stay 17 is mounted. This is advantageous in effectively preventing deformation of the instrument panel member 12 around the mounting part Z of the center stay 17, and in securely suppressing movement of the steering shaft 11 and the steering wheel 18 inward in the vehicle width direction.

Further, in this embodiment, the hole part 20 as a fragile part is formed in a portion of the instrument panel member 12 between the steering shaft support part 16 and the instrument panel side bracket 13 on the side near the steering shaft 11.

According to the above configuration, it is possible to obtain the aforementioned effects with a simplified configuration.

In addition to the above, in this embodiment, the hole part 20 is formed in an outer peripheral part (particularly, in a lower part of an outer peripheral part) of the instrument panel member 12 located on the vehicle body rear side with respect to the centerline passing through the cross-sectional center of the instrument panel member 12 in the up-down direction (see FIG. 4).

As described above, in the case where the hole part 20 is formed at a position in a rear side region of an outer peripheral part of the instrument panel member 12, it is possible to securely bend the instrument panel member 12 toward the vehicle body rear side at the time of a vehicle frontal collision. Accordingly, the above configuration is advantageous in suppressing movement of the steering shaft 11 and the steering wheel 18 inward in the vehicle width direction to thereby securely restrain the vehicle occupant DR by the airbag 19.

Particularly, in this embodiment, the hole part 20 formed in the instrument panel member 12 serves as a fragile part. Accordingly, it is easy to form a fragile part by a hole forming process such as a drilling process.

A fragile part to be formed in the instrument panel member 12 is not limited to the hole part 20 as described above, as far as it is possible to lower the strength. For instance, a concave groove part or a reduced diameter part may be formed as a fragile part. In the following, examples of forming a fragile part other than the hole part 20 are described as other embodiments.

Figure 6:
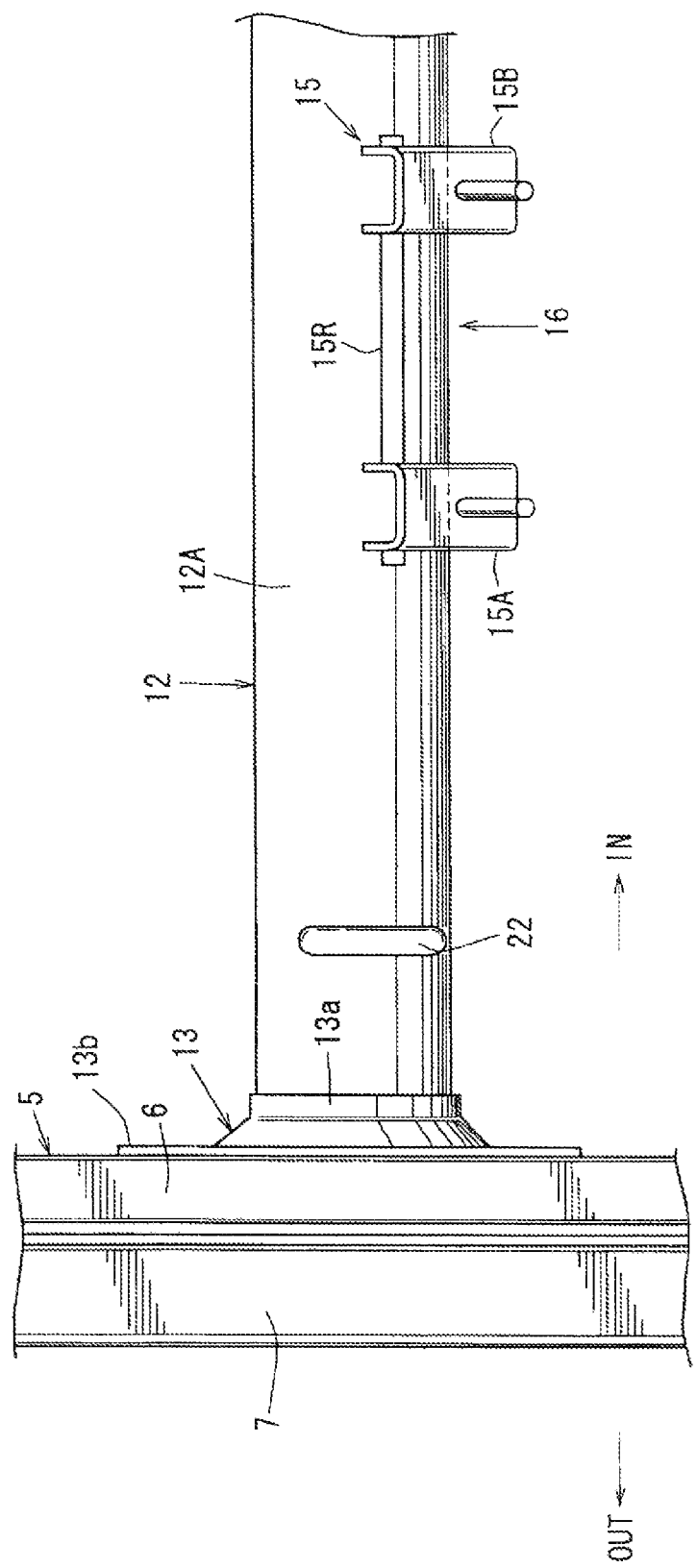
FIG. 6 is a diagram illustrating a state of a vehicle-occupant protection structure according to another embodiment of the invention, as viewed from the inside of a vehicle cabin.
Figure 7:
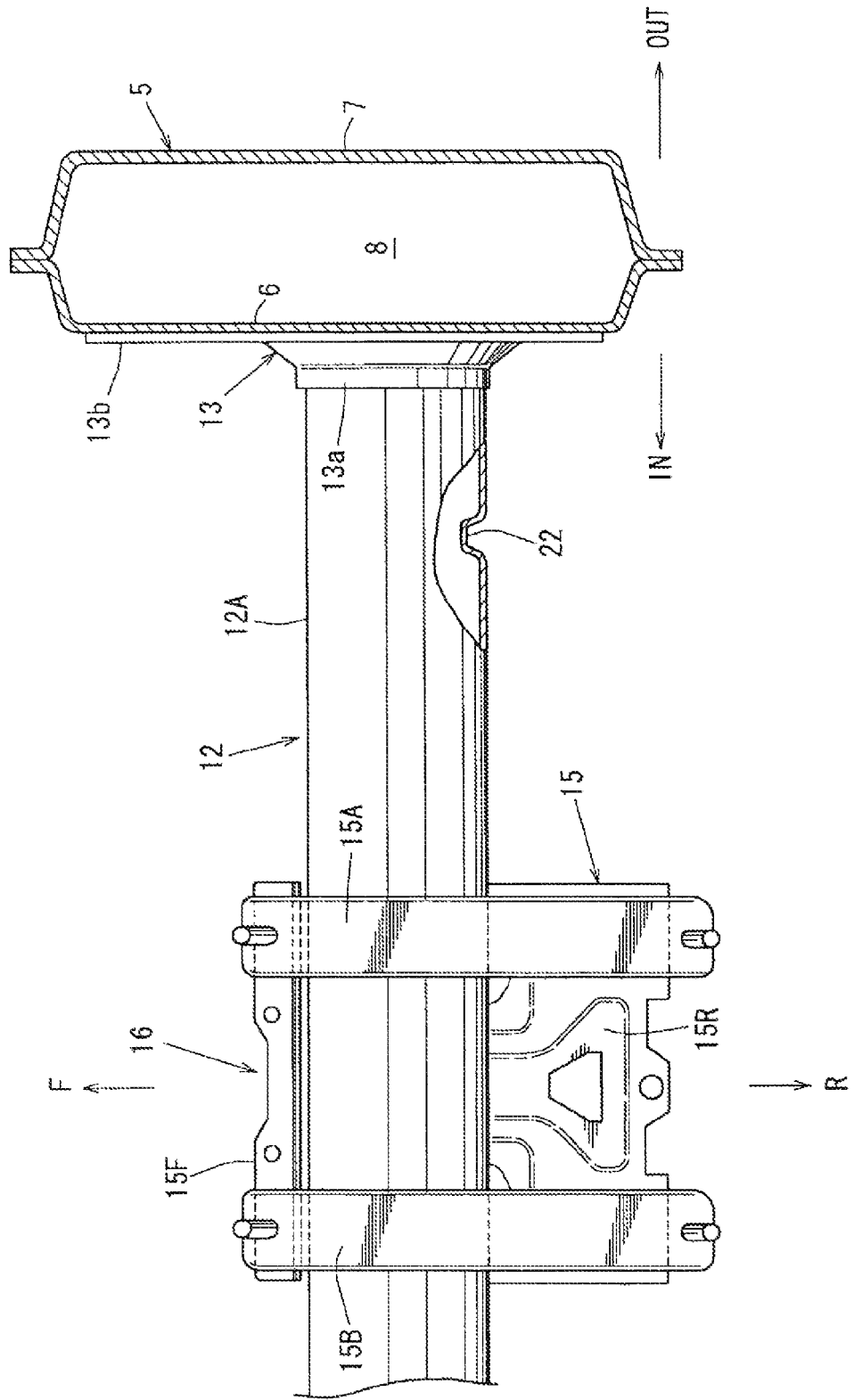
FIG. 7 is a bottom plan view illustrating essential parts of FIG. 7.

Another embodiment of the vehicle-occupant protection structure is described referring to FIG. 6 and FIG. 7. FIG. 6 is an explanatory diagram illustrating a state of the inside of a vehicle cabin, as viewed from the front side, and FIG. 7 is a bottom plan view of FIG. 6.

In this embodiment, a concave groove part 22 as a fragile part is formed in a portion of an instrument panel member 12 between a steering shaft support part 16 and an instrument panel side bracket 13 on the side near a steering shaft 11.

The concave groove part 22 is formed in such a manner that a part of a large diameter part 12A of the instrument panel member 12 is indented inward in the radial direction. Specifically, the concave groove part 22 is integrally formed with a rear surface of an outer peripheral part of the large diameter part 12A of the instrument panel member 12, in other words, a back surface part facing a vehicle occupant. The concave groove part 22 is formed to extend in a predetermined range in the circumferential direction of the large diameter part 12A.

Constituting a fragile part by the concave groove part 22 as described above also makes it possible to form the fragile part by a simplified process of the instrument panel member 12.

The other configuration, operation, and effect of the embodiment illustrated in FIG. 6 and FIG. 7 are substantially the same as those of the foregoing embodiment. Accordingly, the same elements in FIG. 6 and FIG. 7 as those in FIG. 1 to FIG. 5 are indicated with the same reference numerals, and a detailed description thereof is omitted herein.

Figure 8:
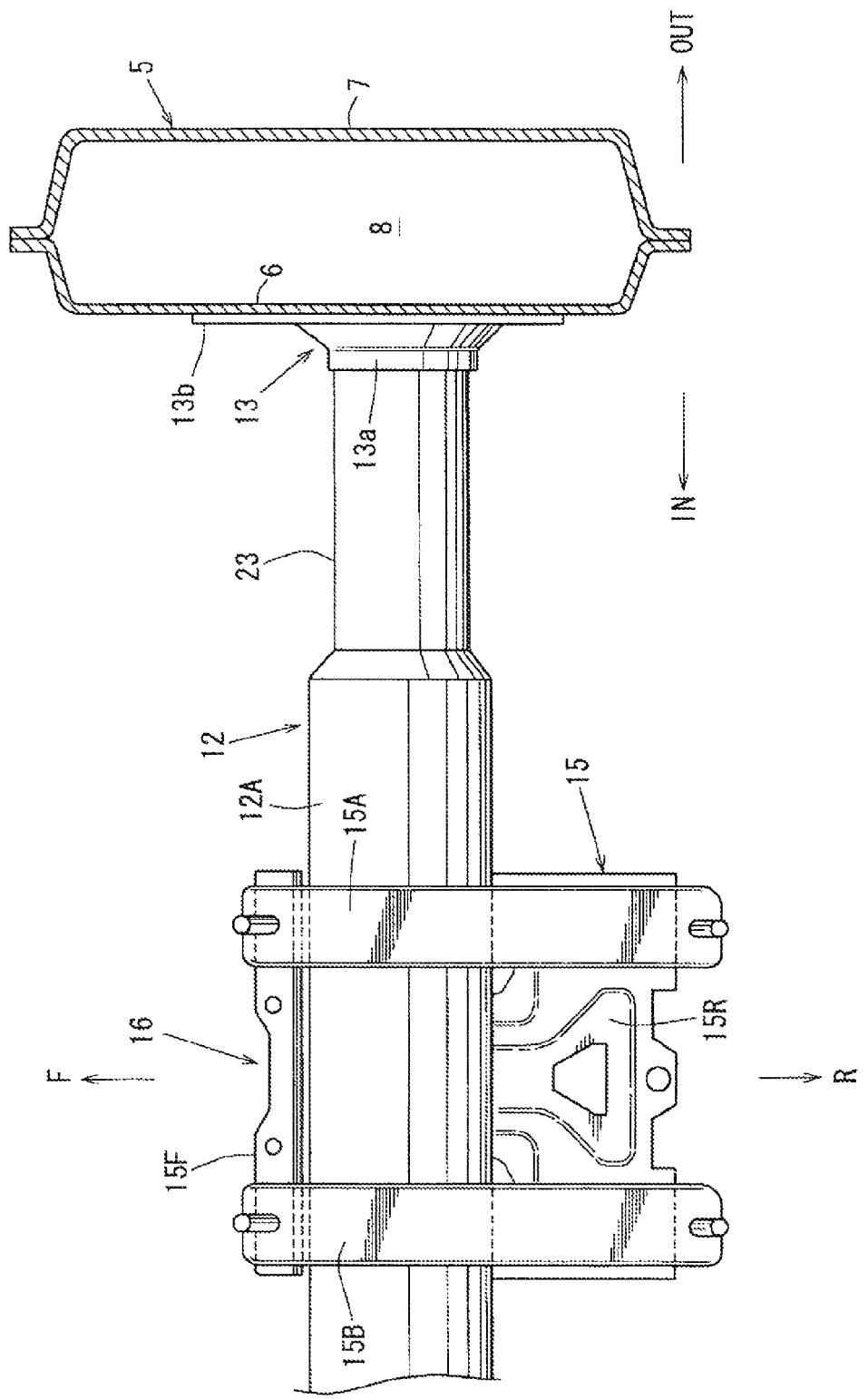
FIG. 8 is a bottom plan view illustrating another embodiment of the vehicle-occupant protection structure.

FIG. 8 is an enlarged bottom plan view illustrating essential parts of yet another embodiment of the vehicle-occupant protection structure.

In this embodiment, a reduced diameter part 23 as a fragile part is integrally formed on a portion of an instrument panel member 12 between a steering shaft support part 16 and an instrument panel side bracket 13 on the side near a steering shaft 11.

The reduced diameter part 23 is formed by a process of reducing the diameter of a part of a large diameter part 12A of the instrument panel member 12. Specifically, a region of the large diameter part 12A near the outer side in the vehicle width direction is processed to have an outer diameter smaller than the diameter of the other region of the large diameter part 12A, whereby the region of the large diameter part 12A near the outer side in the vehicle width direction is formed into the reduced diameter part 23 having a relatively small diameter. Thus, a step portion having a difference in outer diameter is formed on an inner end (a boundary with respect to the large diameter part 12A other than the reduced diameter part 23) of the reduced diameter part 23 in the vehicle width direction.

As described above, constituting a fragile part by the reduced diameter part 23 also makes it possible to form the fragile part by a simplified process of the instrument panel member 12. In the case where the reduced diameter part 23 is used as a fragile part, the fragile part is formed over the entire circumference of a certain region of the instrument panel member 12.

The other configuration, operation, and effect of the embodiment illustrated in FIG. 8 are substantially the same as those of the foregoing embodiments. Accordingly, the same elements in FIG. 8 as those in FIG. 1 to FIG. 7 are indicated with the same reference numerals, and a detailed description thereof is omitted herein.

Figure 9:
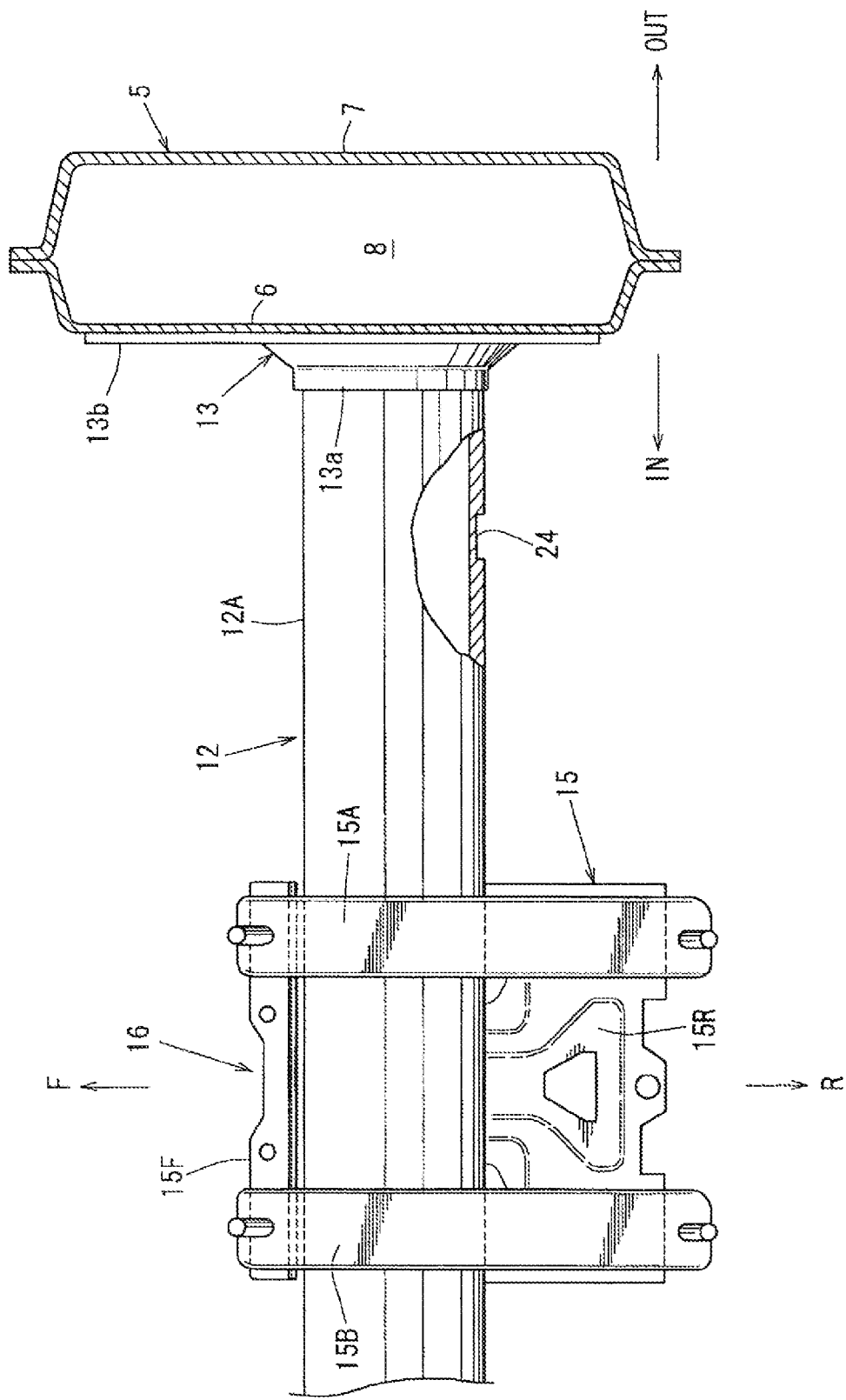
FIG. 9 is a bottom plan view illustrating yet another embodiment of the vehicle-occupant protection structure.

FIG. 9 is an enlarged bottom plan view illustrating essential parts of yet another embodiment of the vehicle-occupant protection structure.

In this embodiment, a thin part 24 as a fragile part is formed on an instrument panel member 12 at a portion thereof between a steering shaft support part 16 and an instrument panel side bracket 13 on the side near a steering shaft 11.

It is possible to form a thin part by forming an instrument panel member of pipe members of two types having thicknesses different from each other. In this embodiment, however, the thin part 24 having a relatively small thickness is formed by scraping a predetermined portion (a specific portion between the steering shaft support part 16 and the instrument panel side bracket 13) of a large diameter part 12A of the instrument panel member 12. The thin part 24 is formed over a predetermined range in the circumferential direction on a rear surface of an outer peripheral part of the large diameter part 12A.

As described above, constituting a fragile part by the thin part 24 also makes it possible to form the fragile part by a simplified process of the instrument panel member 12.

The other configuration, operation, and effect of the embodiment illustrated in FIG. 9 are substantially the same as those of the foregoing embodiments. Accordingly, the same parts in FIG. 9 as those in FIGS. 1 to 8 are indicated with the same reference numerals, and a detailed description thereof is omitted herein.

Figure 10:
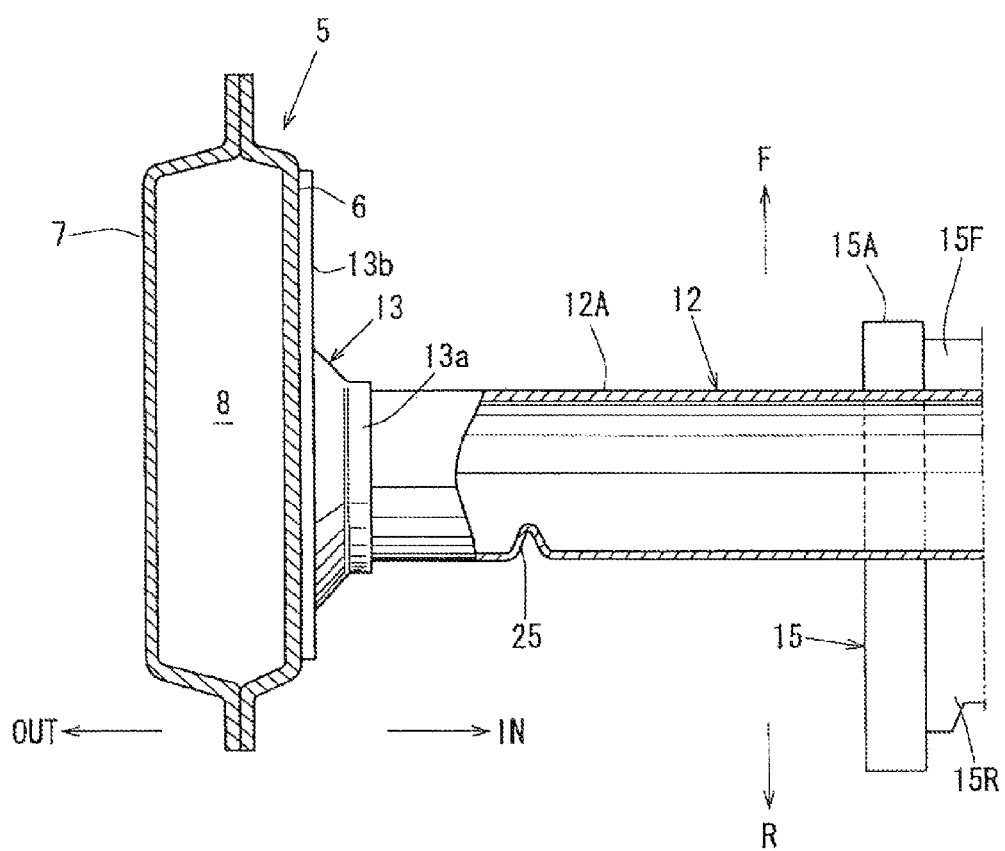
FIG. 10 is a plan view illustrating still another embodiment of the vehicle-occupant protection structure.

FIG. 10 is an enlarged plan view illustrating essential parts of still another embodiment of the vehicle-occupant protection structure.

In this embodiment, a notch part 25 as a fragile part is formed in a portion of an instrument panel member 12 between a steering shaft support part 16 and an instrument panel side bracket 13 on the side near a steering shaft 11.

The notch part 25 is formed by indenting a part of a rear surface of a large diameter part 12A of the instrument panel member 12 in a forward direction (inward in the radial direction). The notch part 25 is a sort of a concave groove part. However, the notch part 25 is different from the concave groove part 22 described in the embodiment illustrated in FIG. 6 and FIG. 7 in a point that the cross section of the notch part 25 has a V-shape in cross-section. In the case where the notch part 25 having a V-shape in cross-section is formed as described above, the notch part 25 securely functions as a bending start point of the instrument panel member 12 at the time of a small offset collision.

As described above, constituting a fragile part by the notch part 25 also makes it possible to form the fragile part by a simplified process of the instrument panel member 12.

The other configuration, operation, and effect of the embodiment illustrated in FIG. 10 are substantially the same as those of the foregoing embodiments. Accordingly, the same parts in FIG. 10 as those in FIGS. 1 to 9 are indicated with the same reference numerals, and a detailed description thereof is omitted herein.

The preferred embodiments of the invention have been described as above. The invention, however, is not limited to the configurations of the foregoing embodiments.

For instance, a fragile part may be constituted of two or more of the combinations selected from the hole part 20, the concave groove part 22, the reduced diameter part 23, the thin part 24, and the notch part 25.

Further, the configuration of each of the embodiments is made based on the premise that the vehicle is a left-hand drive car. Alternatively, the invention may be applied to a right-hand drive car.

Further, in the foregoing embodiments, forming a fragile part (e.g. the hole part 20, the concave groove part 22, the reduced diameter part 23, the thin part 24, or the notch part 25) on the instrument panel member 12 makes it possible to bend the instrument panel member 12 at a portion thereof between the steering shaft support part 16 and the instrument panel side bracket 13 (a linking part) on the side near the steering shaft 11 prior to the instrument panel member 12 at a portion thereof between the steering shaft support part 16 and the instrument panel side bracket 14 (a linking part) on the far side from the steering shaft 11 at the time of a frontal vehicle collision. However, as far as it is possible to obtain substantially the same effects as described above, it is possible to configure a part other than the fragile part.

Lastly, a summary of the configurations and the advantages of the invention is described based on the disclosure of the embodiments.

A vehicle-occupant protection structure of the invention is applied to a vehicle comprising a pair of vehicle body component members disposed on a left side and a right side of a vehicle body, an instrument panel member disposed to extend in a vehicle width direction between the paired vehicle body component members, and a pair of linking parts disposed on both ends of the instrument panel member in the vehicle width direction and linked to inner walls of the respective vehicle body component members. In the vehicle-occupant protection structure, a steering shaft support part configured to support a steering shaft is disposed on a portion of the instrument panel member on the left side or the right side with respect to a center part of the instrument panel member in the vehicle width direction. A strength of the instrument panel member at a portion thereof between the steering shaft support part and the linking part on a side near the steering shaft is set lower than a strength of the instrument panel member at a portion thereof between the steering shaft support part and the linking part on a far side from the steering shaft, with respect to a load input through the linking part on the side near the steering shaft in a vehicle body front-rear direction.

In the invention, the paired vehicle body component members may be hinge pillars, and the inner walls of the vehicle body component members may be hinge pillar inner parts.

According to the above configuration, at the time of a vehicle frontal collision, particularly, at the time of a small overlap collision, the portion of the instrument panel member (a fragile part of the instrument panel member whose strength is weak) between the steering shaft support part and the linking part linked to the vehicle body component member on the side near the steering shaft is bent first. Accordingly, movement of the rear part of the steering shaft and the steering wheel inward in the vehicle width direction is suppressed, whereby it is possible to securely restrain a vehicle occupant (specifically, the head and the breast of a vehicle occupant) by an airbag deployed from the steering wheel.

In the vehicle-occupant protection structure, in the case where a support member to be linked to a vehicle body component member other than the paired vehicle body component members is mounted on the portion of the instrument panel member between the steering shaft support part and the linking part on the far side from the steering shaft, preferably, a strength difference of the instrument panel member may be set in such a manner that the portion of the instrument panel member between the steering shaft support part and the linking part on the side near the steering shaft is bent, prior to the portion of the instrument panel member on which the support member is mounted, by the load input through the linking part on the side near the steering shaft in the vehicle body front-rear direction.

According to the above configuration, the portion of the instrument panel member between the steering shaft support part and the linking part on the side near the steering shaft is bent prior to the portion of the instrument panel member on which the support member is mounted. Accordingly, the above configuration is advantageous in effectively preventing deformation of the instrument panel member around the mounting part of the support member, and in securely suppressing movement of the steering shaft and the steering wheel inward in the vehicle width direction.

In the vehicle-occupant protection structure, preferably, a fragile part is formed on the portion of the instrument panel member between the steering shaft support part and the linking part on the side near the steering shaft.

According to the above configuration, it is possible to obtain the aforementioned effects with a simplified configuration.

In the vehicle-occupant protection structure, preferably, the fragile part may be formed on an outer peripheral part of the instrument panel member located on a vehicle body rear side with respect to a centerline passing through a cross-sectional center of the instrument panel member in an up-down direction.

In the case where the position of the fragile part is specified in a rear side region of the outer peripheral part of the instrument panel member, it is possible to securely bend the instrument panel member toward the vehicle body rear side at the time of a vehicle frontal collision. Accordingly, the above configuration is advantageous in securely suppressing movement of the steering shaft and the steering wheel inward in the vehicle width direction to thereby securely restrain a vehicle occupant by an airbag.

In the vehicle-occupant protection structure, preferably, the fragile part may be constituted of at least one of a hole part, a concave groove part, or a reduced diameter part formed in the instrument panel member.

According to the above configuration, it is possible to constitute the fragile part by one, or two or more combinations of the hole part, the concave groove part, and the reduced diameter part; and it is possible to form the hole part, the concave groove part, and the reduced diameter part with a simplified process of the instrument panel member.

Further, the invention relates to a vehicle-occupant protection method for a vehicle comprising a pair of vehicle body component members disposed on a left side and a right side of a vehicle body, an instrument panel member disposed to extend in a vehicle width direction between the paired vehicle body component members, a pair of linking parts disposed on both ends of the instrument panel member in the vehicle width direction and linked to inner walls of the respective vehicle body component members, a steering shaft support part disposed on a portion of the instrument panel member located on the left side or the right side with respect to a center part of the instrument panel member in the vehicle width direction for supporting a steering shaft, a steering wheel mounted on a rear end of the steering shaft, and an airbag provided in the steering wheel and configured to deploy in such a manner as to cover the steering wheel at a time of a vehicle frontal collision. The method includes varying a strength of the steering shaft depending on a position thereof in the vehicle width direction in such a manner that the instrument panel member at a portion thereof between the steering shaft support part and the linking part on a side near the steering shaft is bent, prior to the instrument panel member at a portion thereof between the steering shaft support part and the linking part on a far side from the steering shaft, by a load input through the linking part on the side near the steering shaft in a vehicle body front-rear direction at the time of the vehicle frontal collision.

According to the above method, it is possible to suppress movement of the deployed airbag inward in the vehicle width direction to thereby securely restrain a vehicle occupant.

INDUSTRIAL APPLICABILITY

As described above, the invention is advantageously used in protecting a vehicle occupant in a vehicle comprising a pair of vehicle body component members disposed on the left side and the right side of a vehicle body, an instrument panel member disposed to extend in the vehicle width direction between the paired vehicle body component members, and a pair of linking parts disposed on both ends of the instrument panel member in the vehicle width direction and linked to inner walls of the respective vehicle body component members.

The invention claimed is:

1. A vehicle-occupant protection structure for a vehicle comprising a pair of vehicle body component members disposed on a left side and a right side of a vehicle body, an instrument panel member disposed to extend in a vehicle width direction between the paired vehicle body component members, and a pair of linking parts disposed on both ends of the instrument panel member in the vehicle width direction and linked to inner walls of the respective vehicle body component members, wherein:
　　a steering shaft support part configured to support a steering shaft is disposed on a portion of the instrument panel member located on the left side or the right side with respect to a center part of the instrument panel member in the vehicle width direction; and
　　a support member to be linked to a vehicle body component member other than the paired vehicle body component members is mounted on a portion of the instrument panel member between the steering shaft support part and the linking part on a far side from the steering shaft; and
　　a fragile part is formed on an outer peripheral surface of the instrument panel member between the steering shaft support part and the linking part on a side near the steering shaft in such a manner that a portion of the instrument panel member between the steering shaft support part and the linking part on the side near the steering shaft is bent, prior to the portion of the instrument panel member on which the support member is mounted, by a load input through the linking part on the side near the steering shaft in a vehicle body front-rear direction,
　　the fragile part being formed only on a surface on a vehicle body rear side with respect to a centerline passing through a cross-sectional center of the instrument panel member in an up-down direction.

2. The vehicle-occupant protection structure according to claim 1, wherein
　　the fragile part is constituted of at least one of a hole part, a concave groove part, or a reduced diameter part formed in the instrument panel member.

3. A vehicle-occupant protection method for a vehicle comprising a pair of vehicle body component members disposed on a left side and a right side of a vehicle body, an instrument panel member disposed to extend in a vehicle width direction between the paired vehicle body component members, a pair of linking parts disposed on both ends of the instrument panel member in the vehicle width direction and linked to inner walls of the respective vehicle body component members, a steering shaft support part disposed on a portion of the instrument panel member located on the left side or the right side with respect to a center part of the instrument panel member in the vehicle width direction for supporting a steering shaft, a steering wheel mounted on a rear end of the steering shaft, and an airbag provided in the steering wheel and configured to deploy in such a manner as to cover the steering wheel at a time of a vehicle frontal collision, the method comprising:
　　forming a fragile part on an outer peripheral surface of the instrument panel member between the steering shaft support part and the linking part on a side near the steering shaft in such a manner that the instrument panel member at a portion thereof between the steering shaft support part and the linking part on a side near the steering shaft is bent, prior to the instrument panel member at a portion thereof between the steering shaft support part and the linking part on a far side from the steering shaft, by a load input through the linking part on the side near the steering shaft in a vehicle body front-rear direction at the time of the vehicle frontal collision, the fragile part being formed only on a surface on a vehicle body rear side with respect to a centerline passing through a cross-sectional center of the instrument panel member in an up-down direction.

* * * * *